United States Patent
Ozaki

(10) Patent No.: US 6,957,029 B1
(45) Date of Patent: Oct. 18, 2005

(54) METHOD AND SYSTEM FOR DISPLAYING ALTERING AND PRODUCING A COPY OF AN IMAGE

(75) Inventor: Arthur H. Ozaki, Escondido, CA (US)

(73) Assignees: Sony Corporation, Kanagawa (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/542,210

(22) Filed: Apr. 4, 2000

(51) Int. Cl.$^7$ .............................................. G03G 15/36
(52) U.S. Cl. ...................... 399/182; 399/81; 399/183; 399/184; 399/185
(58) Field of Search ................................ 358/296, 444, 358/448, 449; 382/165, 171, 176, 282, 291; 396/569, 639; 399/81, 182, 183, 184, 185, 194, 366

(56) References Cited

U.S. PATENT DOCUMENTS

| | | | | |
|---|---|---|---|---|
| 4,272,187 A | * | 6/1981 | Birdsall et al. | 399/182 |
| 5,794,104 A | * | 8/1998 | Maruyama | 399/183 |
| 5,822,660 A | * | 10/1998 | Wen | 399/194 |
| 6,078,767 A | * | 6/2000 | Hino et al. | 399/182 |
| 6,226,105 B1 | * | 5/2001 | Fukushi | 358/452 |

* cited by examiner

Primary Examiner—Arthur T. Grimley
Assistant Examiner—Hoang Ngo
(74) Attorney, Agent, or Firm—Wagner, Murabito & Hao LLP

(57) ABSTRACT

A method and system for verifying and altering an area of an image to be photocopied prior to producing a copy. According to one embodiment of the present invention, an image capturing device is used to capture an image of items to be copied. A representation of this captured image is then displayed on a screen to be previewed by a user prior to producing a copy. A control unit of the present embodiment allows the user to alter the representation displayed on the display screen and to control the form and content of the copy produced. Alterations to the representation include, but are not limited to, elimination of certain portions (cropping), selection of certain portions for copying, rearranging by cutting and pasting, identifying areas to be copied in color, identifying areas to be copied as shaded and identifying areas to be copied in a different size. Further, the control unit will allow the user to edit the representation on the display screen. In this manner the user has full control over the representation on the display screen as well as visual confirmation of the material to be duplicated prior to producing a copy. One embodiment of the present invention includes any apparatus that captures an image and then reproduces this image in output using a display device, wherein this apparatus may include the capability for image modification.

21 Claims, 11 Drawing Sheets

METHOD AND SYSTEM FOR DISPLAYING ALTERING AND PRODUCING A COPY OF AN IMAGE

BACKGROUND OF THE INVENTION

1. Field of the Invention

The present invention generally relates to the field of office equipment. More specifically, the present invention relates to the field of copier systems.

2. Related Art

Considerable time and material is wasted copying documents with existing office copying machines. Prior art copying machine products do not provide feedback indicating the exact image that will be duplicated. Some machines have a feature that senses and selects the correct size and orientation of the paper for duplication. This is an improvement. However, it is still not an ideal solution.

This shortcoming is especially noticeable when trying to copy a certain section of a magazine or newspaper. Several copies are wasted trying to get the whole image copied. In addition, extraneous articles are included in the copies since editing is not possible on current machines.

More specifically, in prior art, the physical dimensions of the copier system input place an upper limit on the physical dimensions of matter to be copied. Prior art copier systems will produce output copy that is a complete replica of all matter present within the confines of the copier system input. In order to produce a copy of an article having physical dimensions greater than the confines of the copier system input, a user must produce output copies of portions of the input article and then cut and paste the output copies to produce a replica of the input article. The difficulty here in lies in multiple repositioning of the input article with sufficient accuracy to produce output copies of portions of the input article.

Further, in prior art copier systems it is not possible to randomly crop out portions of a document to be reproduced. Nor is it possible to selectively copy a particular portion of a document. Consequently, the flexibility with which a user can produce output copy is limited. Thus what is needed is a copier system that does not limit the flexibility with which the user can produce an output copy.

SUMMARY OF THE INVENTION

Accordingly, the present invention provides a method and system for verifying an area of an image to be photocopied prior to producing a copy. According to an embodiment of the present invention, an image capturing device is used to capture an image of items to be copied. A representation of this captured image is then displayed on a screen to be previewed by a user prior to producing a copy. The present invention allows the user to reproduce a portion of a document that is otherwise too large for reproduction in its entirety by adjusting the placement of the document and previewing the portion to be reproduced. The present invention also provides users with greater control over the form and substance of the copy produced.

In one embodiment, the system of the present invention includes a control unit that enables the user to alter the representation displayed on the display screen. Alterations to the representation include, but are not limited to, elimination of certain portions, selection of certain portions for copying, rearranging by cutting and pasting, identifying areas to be copied in color, identifying areas to be copied as shaded and identifying areas to be copied in a different size. Further, the control unit of the present embodiment enables the user to edit the representation on the display screen. The hard copy produced at the output is altered correspondingly. By these means the user has full control over the representation on the display screen as well as visual confirmation of the material to be duplicated prior to producing a copy.

Embodiments of the present invention include the above and further include a method of reproducing hard copies for a document. The method of the present embodiment includes steps of: a) capturing an image of a document to be copied; b) displaying the image for preview by a user prior to copying, and; c) reproducing on hard copy the image upon receiving a user confirmation.

DETAILED DESCRIPTION OF THE PREFERRED EMBODIMENTS

In the following detailed description of the present invention, a method and system for displaying, altering and producing a copy of an image, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 1A:
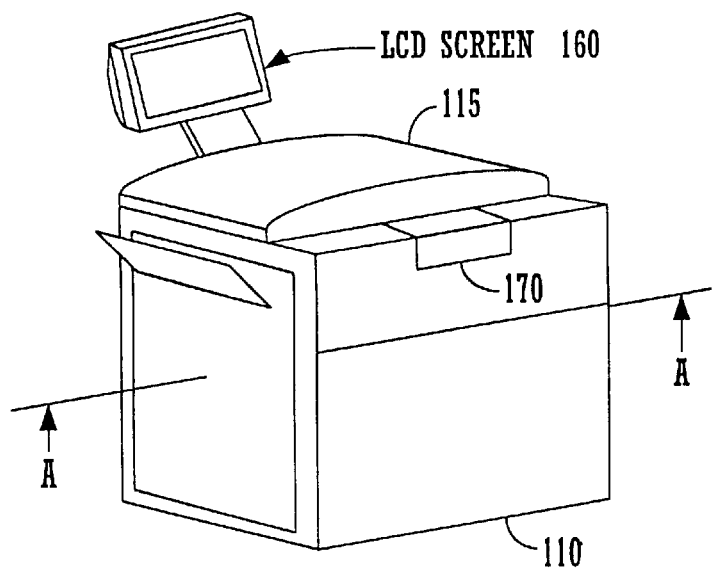
FIG. 1A illustrates the components of an image reproduction system in accordance with one embodiment of the present invention.

FIG. 1A illustrates a copier system 100 according to one embodiment of the present invention. As illustrated, copier system 100 includes a copier system housing 110 that provides means for support of the entire system. The housing 110 includes a moveable document cover 115 that is coupled to the housing by means of a hinge. Also illustrated in FIG. 1A is a display screen 160 that is attached to the document cover 115. A control panel 170 for user input commands is located on the front center portion of the housing 110.

Figure 1B:
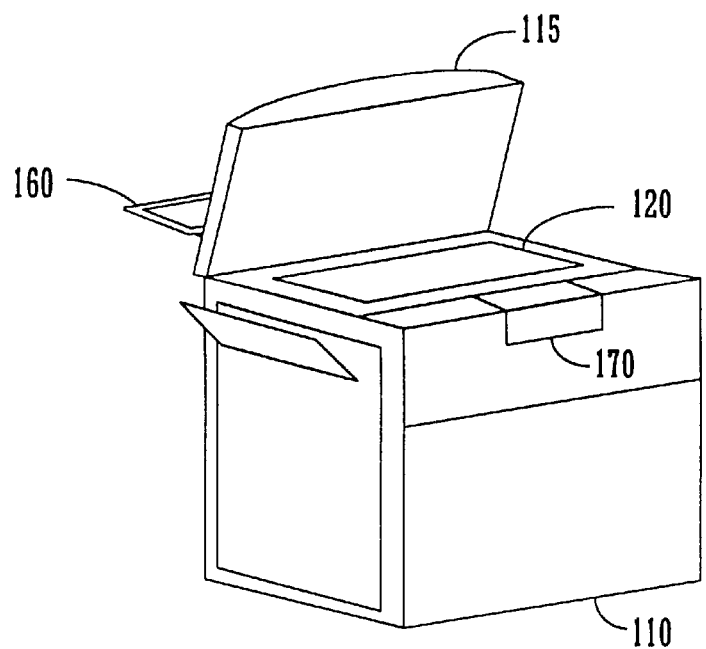
FIG. 1B illustrates the input copy device in an image reproduction system in accordance with one embodiment of the present invention.

FIG. 1B illustrates a copier system 100 with the document cover 115 positioned such that a document to be copied can be placed on the input copy device 120. In one embodiment, the input copy device 120 is a rectangular glass plate.

Figure 1C:
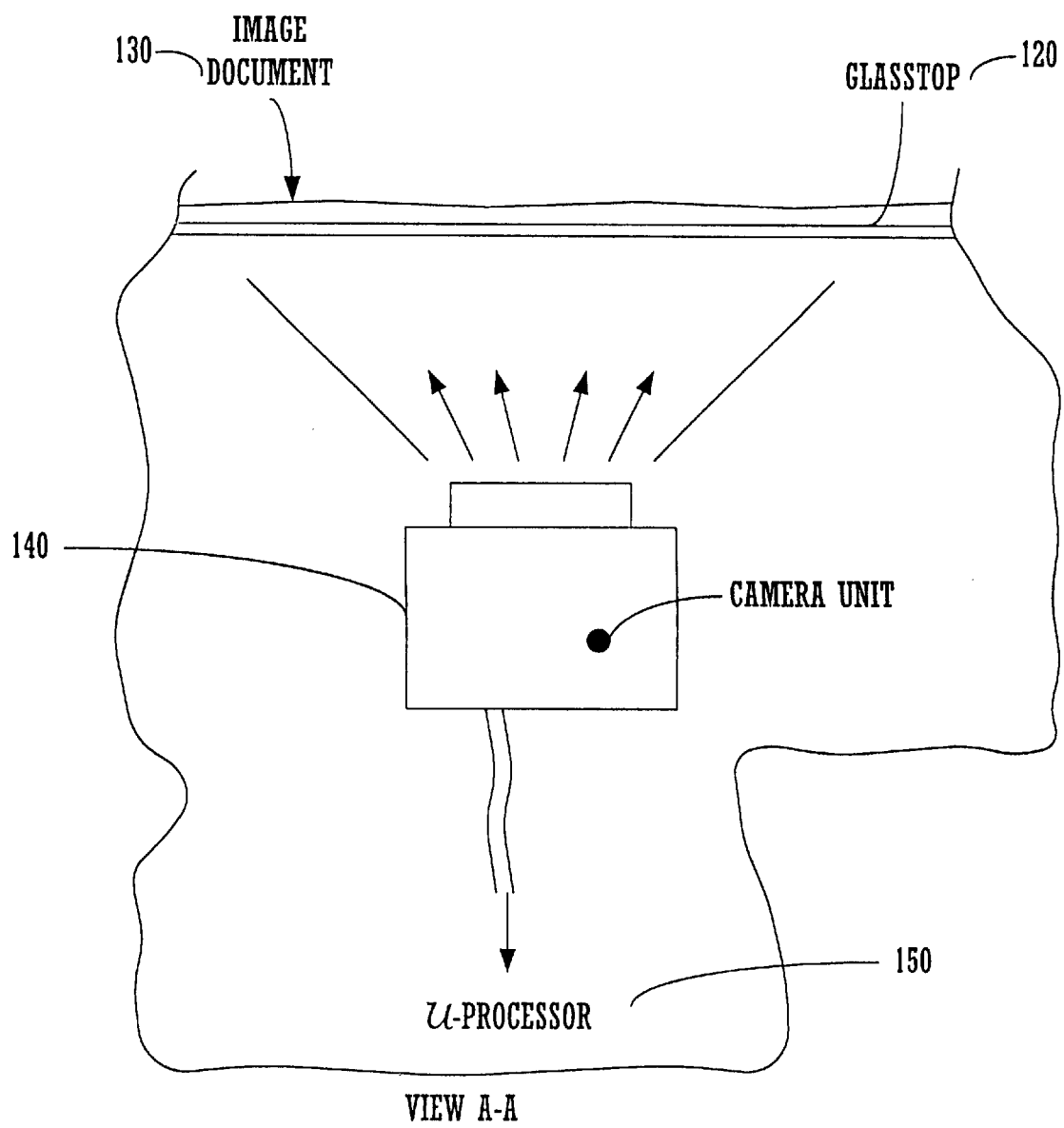
FIG. 1C illustrates a cross-sectional view A—A of an image reproduction system in accordance with one embodiment of the present invention.

FIG. 1C illustrates a cross-sectional view A—A of the copier system 100.

As illustrated, contained within housing 110 is a camera unit 140 that is positioned for taking a snapshot of an image document 130 placed on the glass plate 120 of the housing 110. Also illustrated is a micro-processor control unit 150 which is located within the housing 110.

The input copy device 120 in FIG. 1B has finite dimensions which define boundaries within which matter must be located in order to be copied. In one embodiment, the input copy device is a rectangular glass plate in which the defining boundary is fixed by the length and width of the plate. A document to be copied 130 is located on the surface of and within the defining boundaries of the plate. Output copy is a replica of whatever is contained within the boundaries of the plate. It is important therefore to position items to be copied relative to the input copy device such that the desired output copy is produced. It is appreciated that there are embodiments for an input copy device other than a flat plane.

The image capturing device 140 is located within the copier system housing. It is positioned for the purpose of capturing and holding an image of a document located within the defined boundaries of the input copy device. According to one embodiment of the present invention, the image capturing device is a digital camera unit. The captured image is then held in the form of digital data.

A control unit 150 is used to accept and store data from the digital camera. In one embodiment of the present invention, the control unit is a microprocessor. Means for altering the form and content of the image data is provided by programs stored in the control unit. In operation, the control unit also has stored programs used to display a representation of the captured image on the display screen 160. In one embodiment of the present invention, the display screen is a liquid crystal display (LCD) unit. The control unit 150 also provides the means for causing the copier 170 to produce output copy that is a replica of the representation on the display screen.

Previewing the representation on the display screen provides a user with the ability to position matter relative to the input copy device in order produce output copy having desired form and substance. By these means, a copy of matter physically too large to be copied in a single operation can be copied in portions without the undesirable gaps and overlays between individual copied portions.

The control panel 170 is the device wherein a user controls operation of the copier system. In one embodiment of the present invention, the control panel is an LCD unit used to display machine options or inquiries, and further to accept user commands by means of touch screen technology. Operating functions such as power on, power off, print, number of copies and copy orientation are initiated by user operation of the control panel. Additionally, a number of functions for altering the representation viewed on the display screen prior to producing a copy are available to the user. In one embodiment of the present invention, a touch pad mouse included as an element of the control panel is used to identify selected portions by delineation, and also to accomplish a cut and paste operation. The existence of other acceptable embodiments for the control panel is appreciated.

Figure 2:
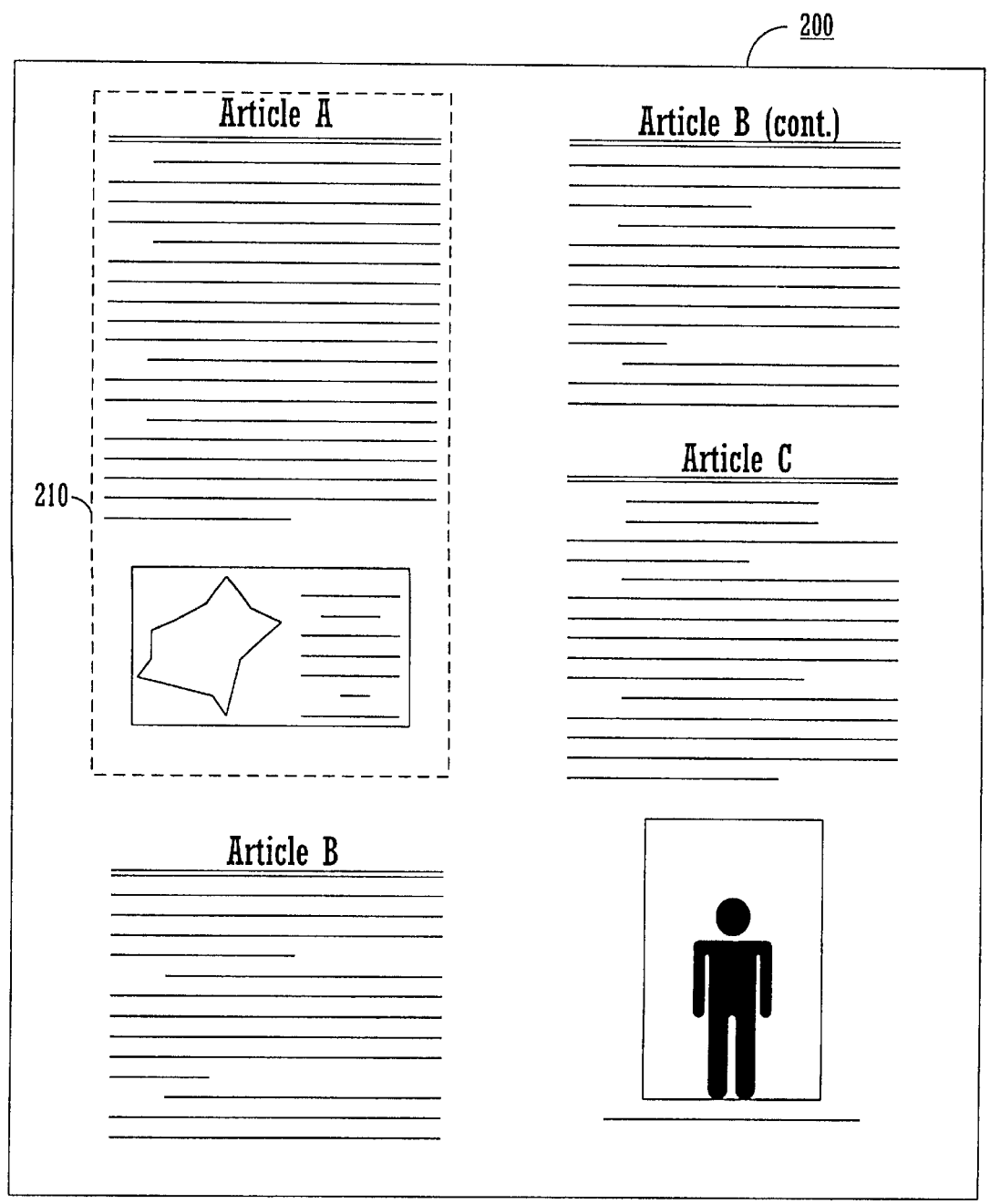
FIG. 2 is a display screen image of a one page document consisting of three distinct articles in which article A has been selected by delineation system in accordance with one embodiment of the present invention.

FIG. 2 is the image of a document 200 having three distinct articles labeled A, B and C as displayed by display screen 160 in accordance with one embodiment of the present invention. The dashed line 210 around article A illustrates user selection of this article by means of input commands to the control panel 170. A number of different options for producing output copy are now available to the user.

Figure 3:
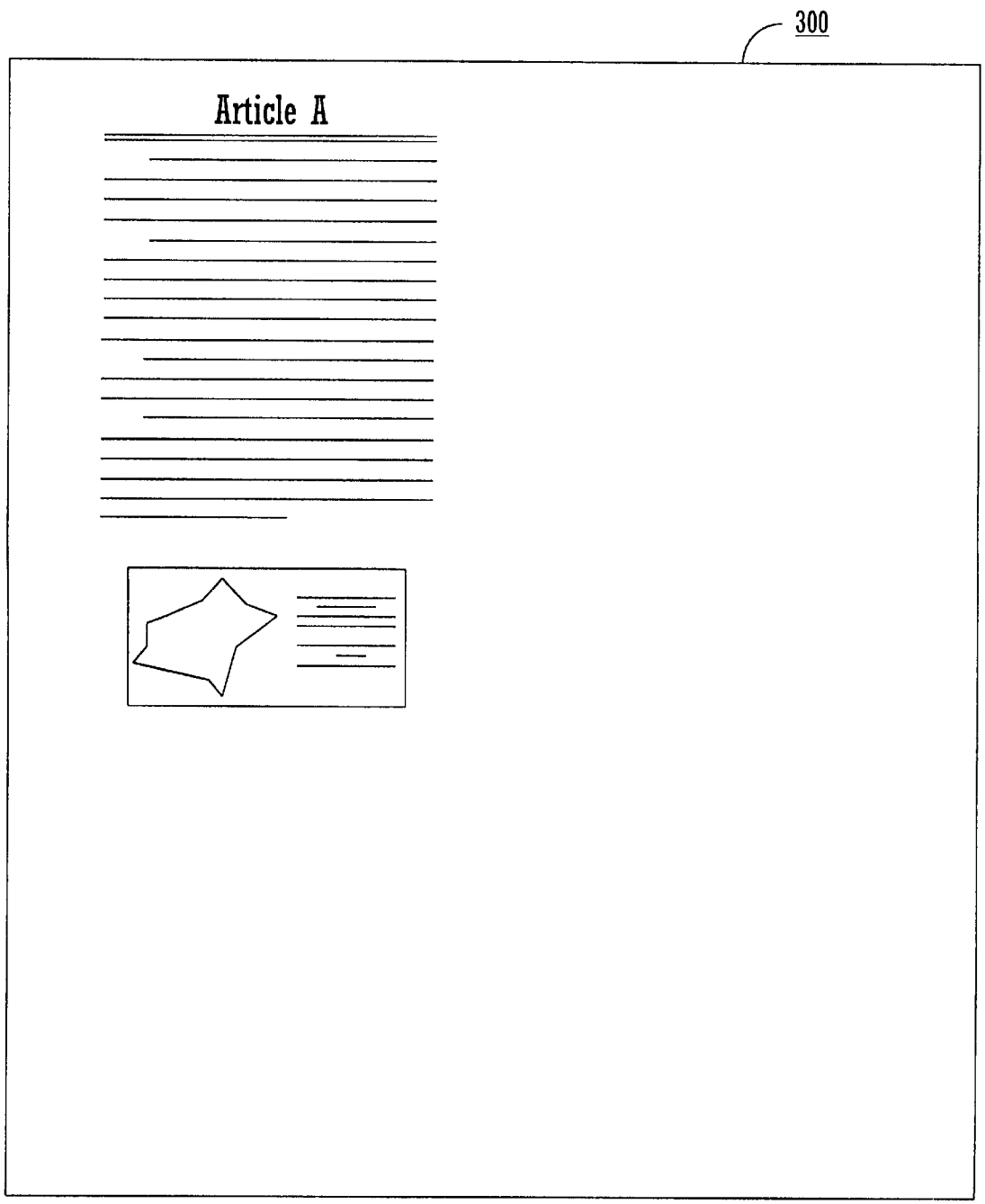
FIG. 3 is a display screen image of article A to be produced as output copy system in accordance with one embodiment of the present invention.

In a first operation, only the selected article A is chosen for reproduction and the screen image changes to that shown in. FIG. 3. Output copy 300 produced at this point is shown in FIG. 3.

Figure 4:
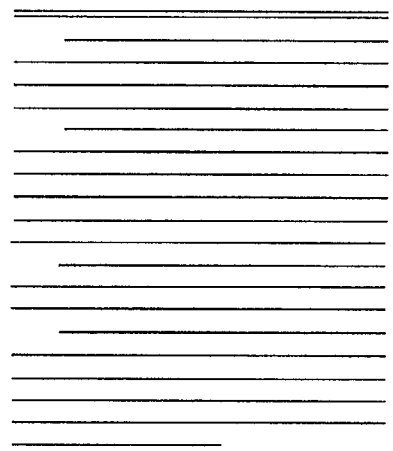
FIG. 4 is a display screen image of article A that has been increased in size before being produced as output copy system in accordance with one embodiment of the present invention.

In a second operation, only the selected article A is chosen for reproduction and the screen image changes to that shown in FIG. 3. However, a user input command is used to amplify the image to full page length as illustrated in FIG. 4. Output copy 400 produced at this point will be as shown in FIG. 4.

Figure 5:
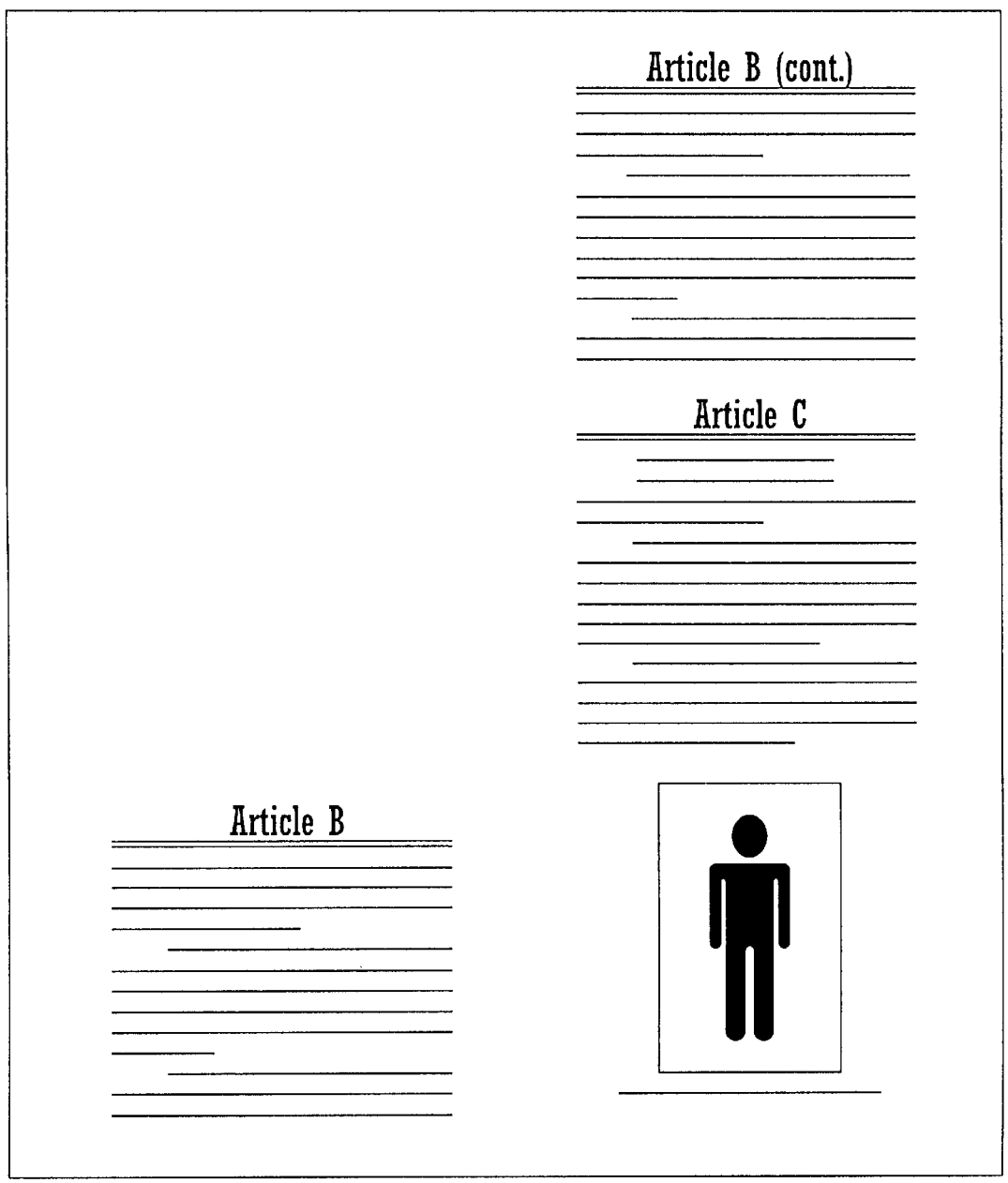
FIG. 5 is a display screen image of the original document in FIG. 2 with article A eliminated before being produced as output copy system in accordance with one embodiment of the present invention.

In a third operation, the selected article A is eliminated from reproduction and the image on the display screen appears as shown in FIG. 5. Output copy 500 produced at this point will be as shown in FIG. 5.

Figure 6:
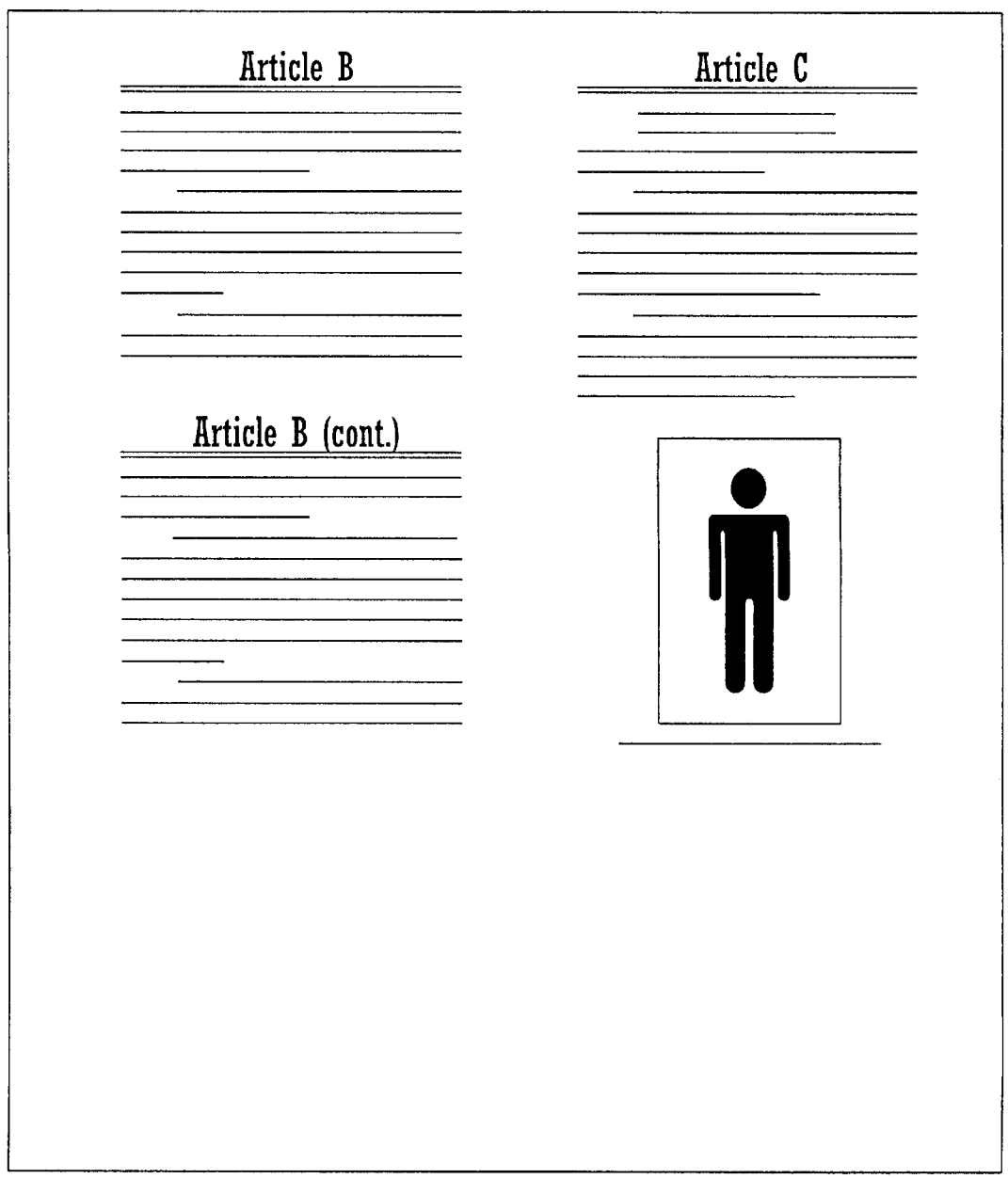
FIG. 6 is a display screen image of articles B and C after rearrangement using a cut and paste operation before producing output copy system in accordance with one embodiment of the present invention.

In a fourth operation, the selected article A is eliminated from reproduction and the image on the display screen appears as shown in FIG. 5. However, a cut and paste operation initiated by user commands rearrange the articles in FIG. 5 to appear as seen in FIG. 6. Output copy 600 produced at this point is shown in FIG. 6.

Figure 7:
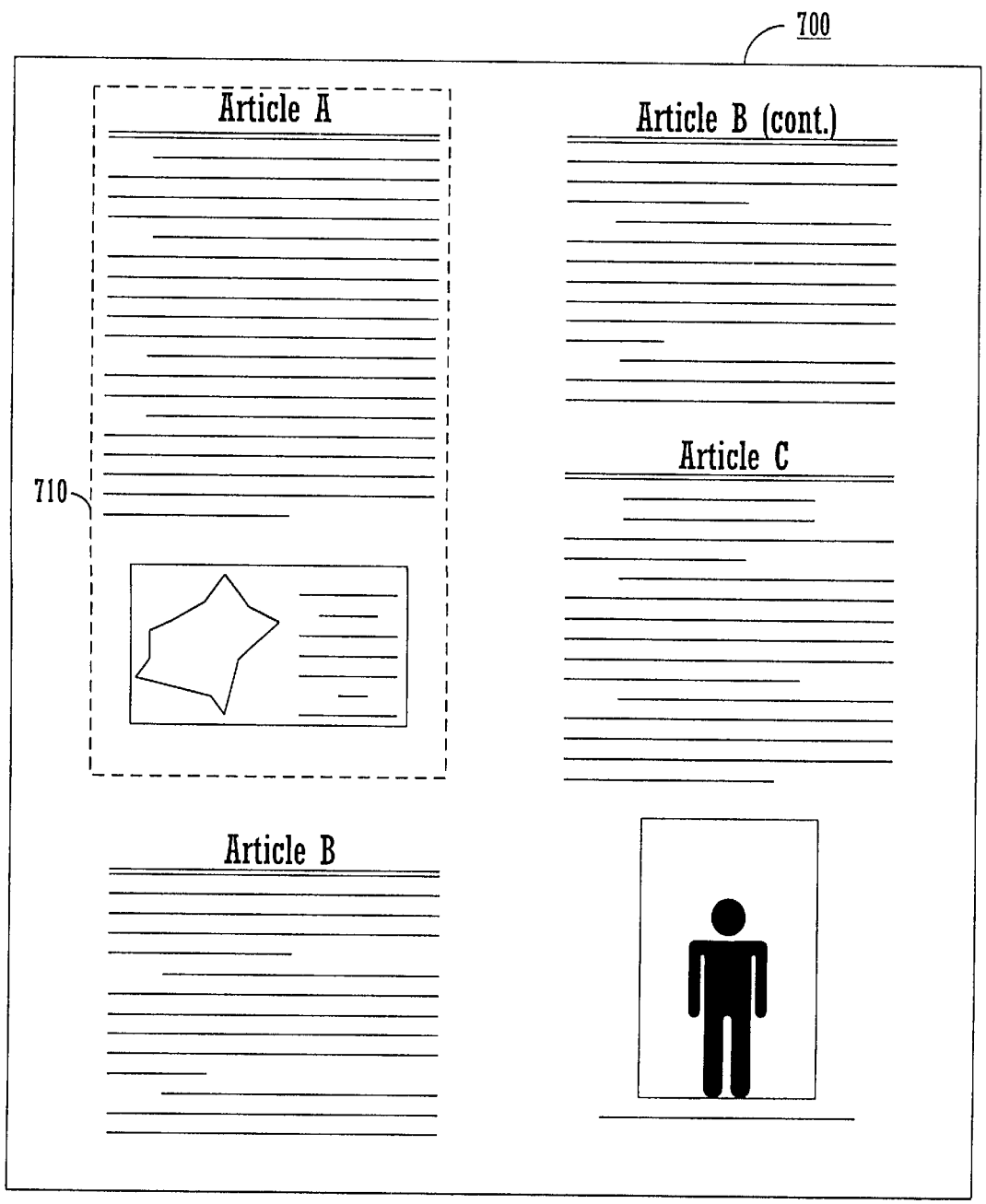
FIG. 7 is a display screen image of the original document in FIG. 2 wherein article A will be reproduced highlighted in output copy system in accordance with one embodiment of the present invention.

In a fifth operation, the selected article A is chosen for highlighting or shading and the screen image changes to that shown in FIG. 7. Output copy 710 produced at this point is shown in FIG. 7.

Figure 8:
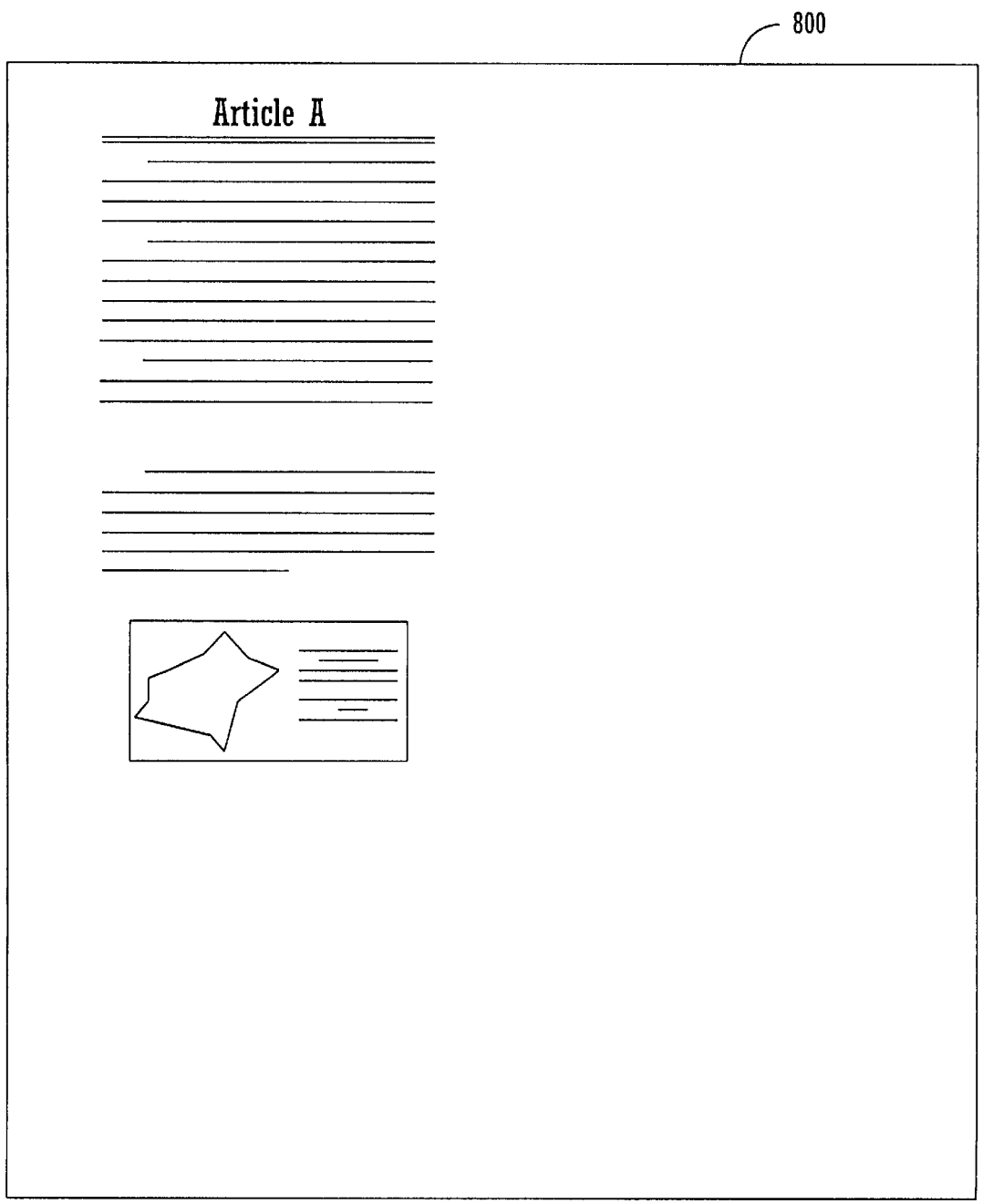
FIG. 8 is a display screen image of article A selected and edited before being reproduced in output copy system in accordance with one embodiment of the present invention.

In a sixth operation, portions of article A have been selected for elimination, and the screen image changes to that shown in FIG. 8. Output copy 800 produced at this point is shown in FIG. 8.

It is to be appreciated that combinations of the operations illustrated in FIGS. 2 through 8 can be applied in order to achieve greater control over the form and content of produced output copy.

Figure 9:
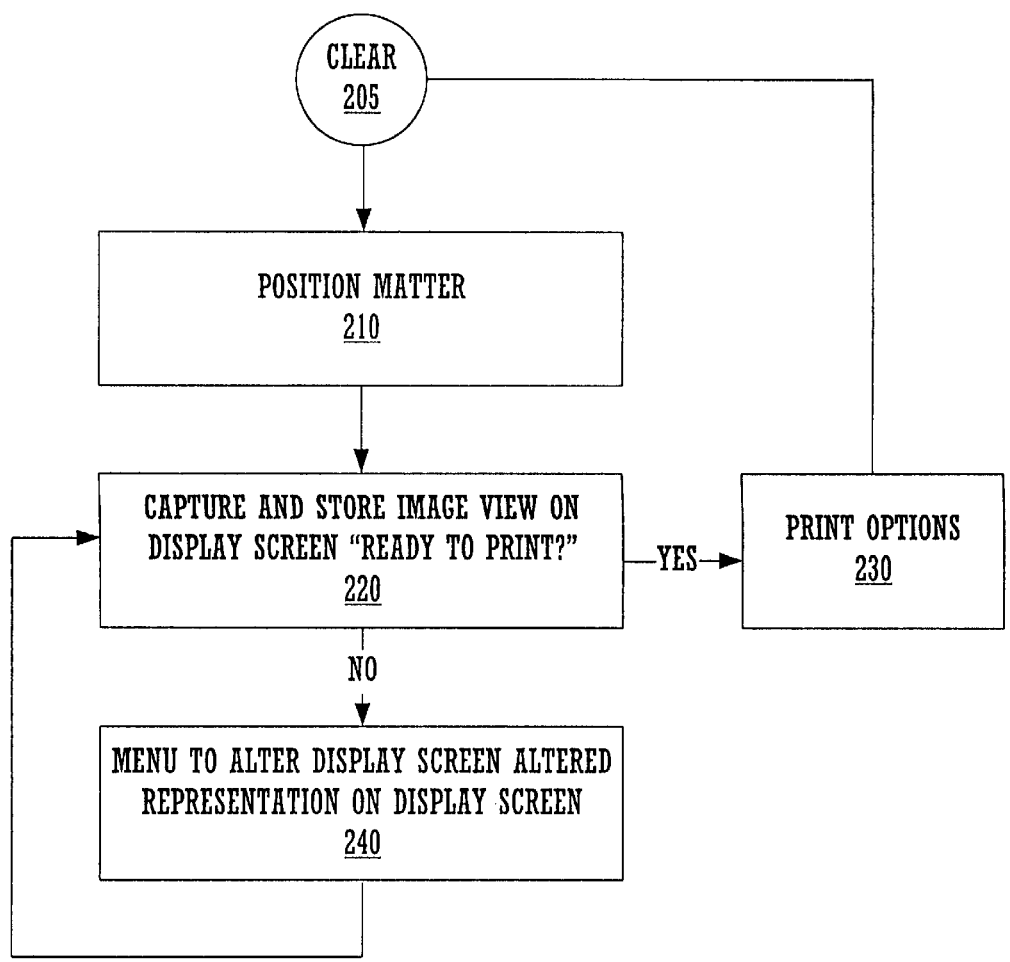
FIG. 9 is a flow diagram illustrating steps of a photocopying process in accordance with one embodiment of the present invention.

FIG. 9 is a flow diagram 900 illustrating the steps for displaying, altering and producing a copy of an image in accordance with one embodiment of the present invention. Flow diagram 900 does not include the steps of power on, power off, or commands used in maintenance, and it is assumed the present system is in a mode prepared to produce copy. It is appreciated that many of the steps of capturing an image, displaying a representation of the captured image on a display screen and altering the displayed representation can be implemented as processor instructions (software or firmware) executed by the control unit 150. In one embodiment of the present invention described here, machine queries to the user as well as user input commands are made by means of the control panel 180.

As illustrated at step 205, a user input command is entered by means of a control panel 170 in order to clear all previous copy data and commands.

At step 210, a document to be copied is located on the input copy device 120. An image of the document matter within the confines of the image capture area is obtained by the camera unit 140. A representation of the captured image is then stored in the control unit 150 and displayed on the display screen 160 for preview by the user. By repositioning the input copy 130 while viewing the image on the display screen, output copy of a desired portion of the input copy can be produced. The user is thus provided the opportunity to rearrange input copy 130 relative to the input copy device 120 while observing the resulting representation on the display screen 160 for the purpose of determining with precision the output copy to be produced. The control panel 180 displays a query to the user "Ready to Print?". The user is thus queried whether or not the representation on the display screen 160 is acceptable to copy. An affirmative response from the user advances to step 230. A negative user response advances to step 240.

At step 230, user input commands are made to choose copy functions such as number of copies to produce. copy orientation, magnification or reduction, and finally the command to copy. Upon completion of the commanded copy functions, a return to step 205 clears the system in preparation for new copy.

At step 240, a menu of available user commands is displayed on the control panel 180. Each of these commands allows the user to alter the representation as displayed on the display screen 160. At the completion of any alteration, the resulting altered image is viewed on the display screen 160. Return to step 220 is affected and the control panel 180 displays a query to the user "Ready to Print?". The user is thus queried whether or not the representation on the display screen 160 is acceptable to copy. An affirmative response from the user advances to step 230. A negative user response advances to step 240. At this point, the user may implement as many alterations to the representation as desired by simply repeating the steps defined by the loop 220, 240 . The user may then produce copy as desired and the system will then return to step 205 to implement the clear function in preparation for future copy.

In one embodiment of the present invention, the menu of user commands displayed on the control panel 180 in step 240 include the ability to alter the representation displayed on the display screen 160 by selecting:

a) portions to be eliminated;

b) only those portions to appear in output copy;

c) portions to be altered in size in output copy' d) portions to be produced in output copy in a color other than black;

e) portions to be produced highlighted in output copy;

f) portions to be produced in a shaded region on output copy;

g) portions to be rearranged using a cut and paste technique;

h) portions to edit.

In one embodiment of the present invention, the method used for selecting portions of the representation on the display screen 160 is a touch pad mouse that can be moved to delineate one or more regions of the representation. It is appreciated that there are other methods and techniques for such selection.

In one embodiment of the present invention, a method and system for verifying and modifying an area of an image prior to producing copy has been described. While the present invention has been described in particular embodiments, it should be appreciated that the present invention should not be construed as limited by such embodiments, but rather construed according to the below claims.

What is claimed is:

1. A system for reproducing an image on hard copy comprising:

a) a housing;

b) a digital camera enclosed within said housing and operable for capturing said first representation of said image;

c) a display screen coupled to said housing for displaying a first representation of said image for preview by a user prior to reproduction;

d) a sub-system operable for altering the visual appearance of said first representation according to a user input, said altering comprising an action selected from the list consisting of eliminating a portion, selecting a portion for sole reproduction, resizing, colorizing, highlighting, shading, editing, and rearranging a plurality of image portions of said first representation to different locations on said screen using cut and paste operations; and e) an image reproduction apparatus enclosed within said housing, said image reproduction apparatus for imprinting a second, visually differentiable reproduction of said image on a hard copy according to said altering of said first reproduction.

2. A system as recited in claim 1 wherein said first reproduction is, selectively, substantially identical to and visually differentiable from said image, according to said user input.

3. A system as recited in claim 1 wherein said image reproduction apparatus is an electrostatic copying apparatus having an electrostatic drum.

4. A system according to claim 1 wherein said subsystem further comprises electronic devices operable for altering said first representation according to said user input and for causing said image reproduction apparatus to alter said second, visually differentiable reproduction of said image correspondingly.

5. A system according to claim 4 wherein said electronic devices comprise circuits operable for adjusting a layout of said image.

6. A system according to claim 1 further comprising electronic devices operable for receiving a user input indicating a portion of said image to be selectively reproduced and operable for causing said image reproduction apparatus to selectively reproduce said portion of said image on hard copy.

7. A system according to claim 1 further comprising electronic devices operable for receiving a user input indicating a portion of said image to be cropped and operable for causing said image reproduction apparatus to reproduce said image without said portion on hard copy.

8. A photocopier system for reproducing a document comprising:

a) a housing;

b) a digital camera enclosed within said housing and operable for capturing said first representation of said image;

c) a display screen coupled to said housing for displaying a first representation of said document for preview by a user prior to reproduction;

d) a sub-system operable for altering the visual appearance of said first representation according to a user input, said altering comprising an action selected from the list consisting of eliminating a portion, selecting a portion for sole reproduction, resizing, colorizing, highlighting, shading, editing, and rearranging a plurality of image portions of said first representation to different locations on said screen using cut and paste operations; and e) an electrostatic copying apparatus enclosed within said housing and having an electrostatic drum for imprinting a second image of said document on a hard copy according to said user input.

9. A photocopier system according to claim 8 wherein said sub-system further comprises electronic devices operable for altering said first image according to said user input and for causing said electrostatic copying apparatus to alter said second image correspondingly.

10. A photocopier system according to claim 9 wherein said electronic devices comprise circuits operable for adjusting a layout of said image.

11. A system according to claim 8 further comprising electronic devices operable for receiving a user input indicating a portion of said document to be reproduced and operable for causing said electrostatic copying apparatus to reproduce said portion of said document on hard copy.

12. A system according to claim 8 further comprising electronic devices operable for receiving a user input indicating a portion of said document to be cropped and operable for causing said electrostatic copying apparatus to reproduce said document without said portion on hard copy.

13. A photocopier system for reproducing hard copies of a document comprising:

a) means for capturing a first image representative of said document;

b) means for displaying said first image for preview by a user prior to reproduction, wherein said means for displaying is a digital camera;

c) means for altering the visual appearance of said first representation according to a user input, said altering comprising an action selected from the list consisting of eliminating a portion, selecting a portion for sole reproduction, resizing, colorizing, highlighting, shading, editing, and rearranging a plurality of image portions of said first representation to different locations on said screen using cut and paste operations; and d) means for imprinting a second image representative of said document on a hard copy after said first image is displayed, corresponding to said user input.

14. A photocopier system as recited in claim 13 wherein said means for displaying comprises an LCD (liquid crystal display) screen.

15. A photocopier system as recited in claim 13 wherein said means for imprinting comprises electrostatic means for transferring said second image on said hard copy.

16. A photocopier system according to claim 13 wherein said means for altering further comprises means for adjusting the layout of said first image.

17. A photocopier system according to claim 13 further comprising:

means for receiving a user input that indicates a portion of said document to be selectively reproduced; and means for causing said imprinting means to reproduce said portion of said document on hard copy.

18. A photocopier system according to claim 13 further comprising:

means for receiving a user input that indicates a portion of said document to be selectively cropped; and means for causing said imprinting means to reproduce said document without said portion on hard copy.

19. A method of reproducing hard copies for a document, said method comprising steps of:

a) capturing a first image of said document with a digital camera;

b) displaying said first image on a display screen for preview by a user;

c) selectively receiving confirmational and alterational input by said user;

d) selectively altering said first image corresponding to said alterational input, said altering comprising an action selected from the list consisting of eliminating a portion, selecting a portion for sole reproduction, resizing, colorizing, highlighting, shading, editing, and rearranging a plurality of image portions of said first representation to different locations on said screen using cut and paste operations; and e) upon receiving said user input, imprinting a second image of said document on hard copy correspondingly.

20. A method according to claim 19 further comprising steps of:

receiving a user input indicating a portion of said document to be selectively reproduced;

altering said first image according to said user input; and altering said second image such that a corresponding portion of said second image is selectively reproduced on hard copy.

21. A method according to claim 19 further comprising steps of:

receiving a user input indicating a portion of said document to be selectively cropped;

altering said first image according to said user input; and altering said second image such that a corresponding portion of said second image is not reproduced on hard copy.

* * * * *